US006387522B2

(12) United States Patent
Mogi et al.

(10) Patent No.: US 6,387,522 B2
(45) Date of Patent: May 14, 2002

(54) GRAIN-ORIENTED ELECTRICAL STEEL SHEET FOR LOW-NOISE TRANSFORMER

(75) Inventors: Hisashi Mogi, Futtsu; Akira Sakaida, Tokyo; Masahiro Fujikura; Masato Mizokami, both of Futtsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/870,148

(22) Filed: May 30, 2001

(30) Foreign Application Priority Data

May 30, 2000 (JP) ....................................... 2000-160511
Apr. 2, 2001 (JP) ....................................... 2001-103588

(51) Int. Cl.[7] ............................ B32B 15/04; B05D 5/00

(52) U.S. Cl. ...................... 428/457; 29/602.1; 148/100; 148/113; 336/218; 427/104; 427/127; 428/900; 428/926; 428/928

(58) Field of Search ................................ 428/457, 900, 428/926, 928; 427/104, 127; 148/100, 113; 336/218; 29/602.1

(56) References Cited

U.S. PATENT DOCUMENTS 3,932,236 A * 1/1976 Wada et al. ................ 148/113
5,961,744 A 10/1999 Yamazaki et al. .......... 148/113

FOREIGN PATENT DOCUMENTS

JP 7-305115 11/1995

OTHER PUBLICATIONS

IEEE Transactions on Magnetics, vol. Mag–14, No. 4, "Relationship Between Total Losses Under Tensile Stress in 3 Percent Si–Fe Single Crystals and their Orientations Near (110) [001]", Tadao Nozawa, et al., Dec. 1978.

OHM, vol. 59, No. 2, pp. 1–7, Dec. 1972.

Journal of Magnetism and Magnetic Materials 160(1996), 123–124, Ultrathick Glassless High Permeability, Grain–Oriented Silicon Steel Sheets with High Woarkability, Y. Yoshitomi, et al. no month.

* cited by examiner

*Primary Examiner*—Robert R. Koehler
(74) *Attorney, Agent, or Firm*—Kenyon & Kenyon

(57) ABSTRACT

The present invention provides a grain-oriented electrical steel sheet, for a low noise transformer, capable of reducing higher harmonics which are highly audible and lowering noise effectively, and relates to a grain-oriented electrical steel sheet for a low noise transformer, characterized by imposing a film tension of 0.5 to 6.0 MPa on the surface by coating or a method corresponding thereto, without forming a glass film on the grain-oriented electrical steel sheet or, if a glass film is formed, after removing the glass film by an arbitrary method.

5 Claims, 3 Drawing Sheets

GRAIN-ORIENTED ELECTRICAL STEEL SHEET FOR LOW-NOISE TRANSFORMER

BACKGROUND OF THE INVENTION

1. Field of the Invention

The present invention relates to an electrical steel sheet, for a low noise transformer excellent in magnetostriction property, used for an iron core of a transformer and the like.

2. Description of the Related Art

In magnetic materials widely used for electrical and electronic apparatuses the lengths change when a magnetic field is applied (this is referred to as "magnetostriction") to cause of transformer noise and the extent thereof has become an important evaluation item in quality control. In recent years, regulation of noise generated by electrical apparatuses is becoming stricter with an increased demand for a better living environment. Therefore, studies for lowering noise, by decreasing magnetostriction, are being carried out.

Among magnetic materials, for grain-oriented electrical steel sheets used for iron cores of transformers, a means for decreasing magnetostriction by reducing closure domains has been applied. The term "closure domains" as cited here means domains having magnetization oriented in the direction perpendicular to the direction of an applied magnetic field. Magnetostriction is caused when this magnetization is turned to a direction parallel to the magnetic field by an applied magnetic field. Accordingly, the fewer the closure domains, the smaller the magnetostriction. The following methods are known as means for decreasing magnetostriction:

① a method for avoiding the formation of closure domains, that cause shape changes by magnetization rotation, by means of aligning the <001> direction of crystal grains with the rolling direction. (T. Nozawa et al, "Relationship between Total Losses under Tensile Stress in 3 Percent Si—Fe Single Crystals and Their Orientations near (110) [001]," IEEE Trans. on Mag., Vol. MAG-14, No.4, 1978), ② a method for eliminating closure domains by releasing plastic strains (Japanese Unexamined Patent Publication No. H7-305115, [Development of Revolutionary Oriented Silicon Steel Sheet, ORIENTCORE HI-B]: OHM 1972. 2), and ③ a method for eliminating closure domains by applying a tension film to a steel sheet (T. Nozawa et al, "Relationship between Total Losses under Tensile Stress in 3 Percent Si—Fe Single Crystals and Their Orientations near (110) [001],"IEEE Trans. on Mag., Vol. MAG-14, No.4, 1978).

These three methods have decreased magnetostriction and have contributed to lowering the noise of electrical apparatuses.

SUMMARY OF THE INVENTION

When a transformer is fabricated from a grain-oriented electrical steel sheet and magnetized, various modes of vibrations are generated in the structure and the oscillation frequencies of harmonics are also generated. In particular, a fundamental frequency of magnetization (for example, 100 Hz in the case of an exciting current of 50 Hz in frequency) and frequencies obtained by multiplying the fundamental frequency by integral numbers (for example, 200, 300, 400 Hz—in the case of an exciting current of 50 Hz in frequency) have especially high intensity among transformer noises. Among these frequencies, relatively low frequency components vibrate an iron core proper directly, while high frequency components resonate the auxiliary units of a transformer, such as a tank, a chiller, a conservator and the like. However, since the vibrations decrease heir intensity exponentially and become less influential at higher frequencies, technologies for reducing the low-frequency components have mainly been tackled so far.

However, demands for further lowering the noise are strong and more sophisticated technologies are required.

The object of the present invention is to provide an electrical steel sheet, for a low noise transformer, excellent in magnetostriction properties, capable of reducing high frequency components in a magnetostriction waveform and lowering noise effectively.

The embodiments of the present invention are as follows:

(1) A grain-oriented electrical steel sheet for a low noise transformer, having a film that imposes a tension of 0.5 MPa to 4.0 MPa on the steel sheet.

(2) A method for producing a grain-oriented electrical steel sheet for a low noise transformer, characterized by imposing a film tension of 0.5 MPa to 4.0 MPa on the surface by coating or a method corresponding thereto, without forming a glass film on the grain-oriented electrical steel sheet or, if a glass film is formed, after removing the glass film by an arbitrary method.

(3) A grain-oriented electrical steel sheet for a low noise transformer characterized by having a $\lambda_{19}$ of $1.5\times10^{-6}$ or less.

(4) A grain-oriented electrical steel sheet for a low noise transformer according to the item (1) or (3), characterized by having a sheet thickness of 0.27 mm or more.

DESCRIPTION OF THE PREFERRED EMBODIMENTS

The gist of the present invention is a grain-oriented electrical steel sheet, for a low noise transformer, which reduces the higher harmonic components of vibrations and greatly lowers noise perceivable by human ears by means of applying an adequate amount of coating on the surfaces without forming a glass film or after removing a formed glass film by an arbitrary method and controlling the magnetostriction waveform.

As described above, all studies have, up to now, been focused on decreasing magnetostriction by reducing closure domains. However, the present inventors found that noise in a relatively high-pitched sound zone, where human ears become more sensitive, is scarcely lowered even if a material having smaller magnetostriction was used, and carried out an extensive study. The explanation thereof will be given hereunder based on the experiment.

The present inventors considered that the reason for generating magnetostriction with higher harmonic waves when a transformer was magnetized at a certain frequency (usually 50 Hz or 60 Hz) might be explained by a non-smooth magnetostriction waveform, and studied the relationship between its smoothness and film tensions.

Figure 1:
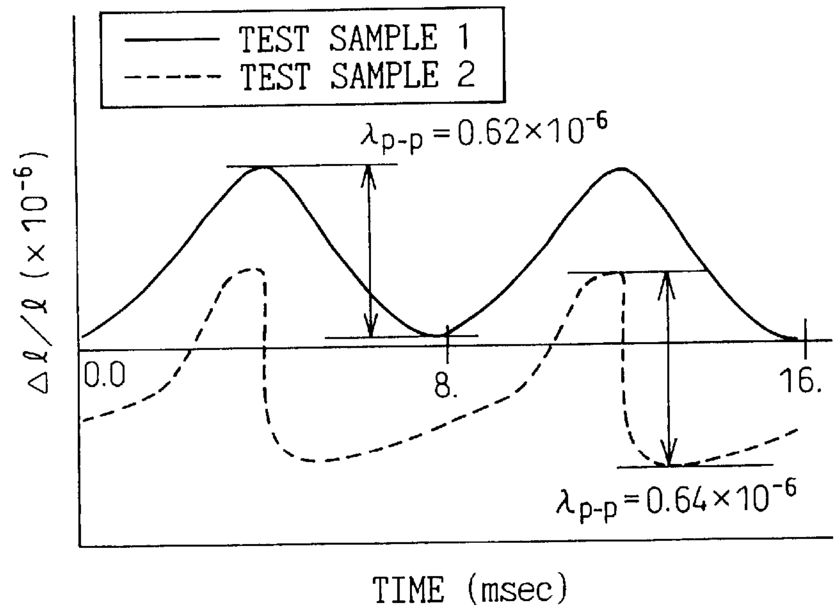
FIG. 1 shows waveforms of magnetostriction.

FIG. 1 shows the change with the passage of time in the magnetostriction of two grain-oriented electrical steel sheets each having a different film tension when they are magnetized at 1.9 T and 60 Hz. It is known that the magnetostriction waveform of a grain-oriented electrical steel sheet varies greatly when laser irradiation conditions, film tensions and the like are changed. In this example, grain-oriented electrical steel sheets produced by a conventional method were employed, and, in test sample 1, the amount of film coating was decreased by 80% from the usual amount to reduce the film tension to some extent. A film tension was calculated from the amount of bending of a steel sheet developed by removing the film on one surface with an acid (formula 1). Here, the amount of bending of a sheet, H (mm), was determined by setting a test sample upright on a flat plate, and measuring the distance between the tangential line at one corner of the bent sheet and the other corner.

$$\sigma_B \approx E/(1-\nu)\times T^2/3t\times 2H/L^2 \quad \text{(formula 1)},$$

where $\sigma_B$: Film tension (g/mm$^2$)

E: Young's modulus (kg/mm$^2$)

ν: Poisson's ratio (=0.3)

t: Thickness of steel sheet (mm)

T: Thickness of test sample (mm)

H: Bending amount of sheet (mm)

L: Length of test sample (mm).

From FIG. 1, $\lambda_{p-p}$, the difference between the maximum value and the minimum value of magnetostriction, is $0.62\times10^{-6}$ in the case of test sample 1 and $0.64\times10^{-6}$ in the case of test sample 2. It is estimated that the noise of both test samples 1 and 2 are at almost the same level in view of magnetostriction amplitude which is one of the conventional indicators.

Figure 2:
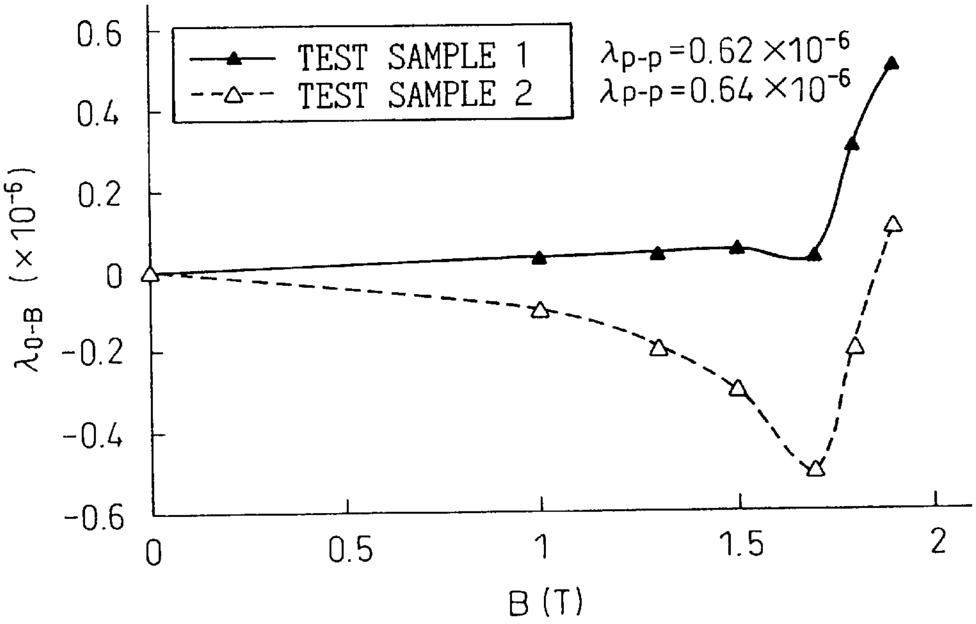
FIG. 2 shows profiles of magnetostriction.

In FIG. 2, is shown the relationship between magnetization magnetic flux density B and magnetostriction $\lambda_B$ (Δl/L of a steel sheet when magnetization magnetic flux density is B T; a so-called O-p value. $\lambda_{19}$ represents the O-p value when B=1.9 T) when these test samples 1 and 2 are magnetized in a range from 0 to 1.9 T at 60 Hz.

With regard to $\lambda_B$ in FIG. 2, $\lambda_B$ values are positive in the full range of magnetic flux density in case of the test sample 1 having a low film tension. However, as for the material having a usual tension, $\lambda_B$ grows bigger in the negative direction until B reaches 1.7 T, and afterwards becomes positive at a higher magnetic flux density.

Three-phase transformers of 630 kVA were fabricated using these two materials, and their noise levels were measured when they were magnetized at 60 Hz and 1.9 T. There occurred a big difference in noise, 66 dB in case of using the test sample 1 and 73 dB in case of using the test sample 2, despite $\lambda_{p-p}$ being almost equal in both cases. Then, the waveforms of these materials were studied in detail.

Figure 3:
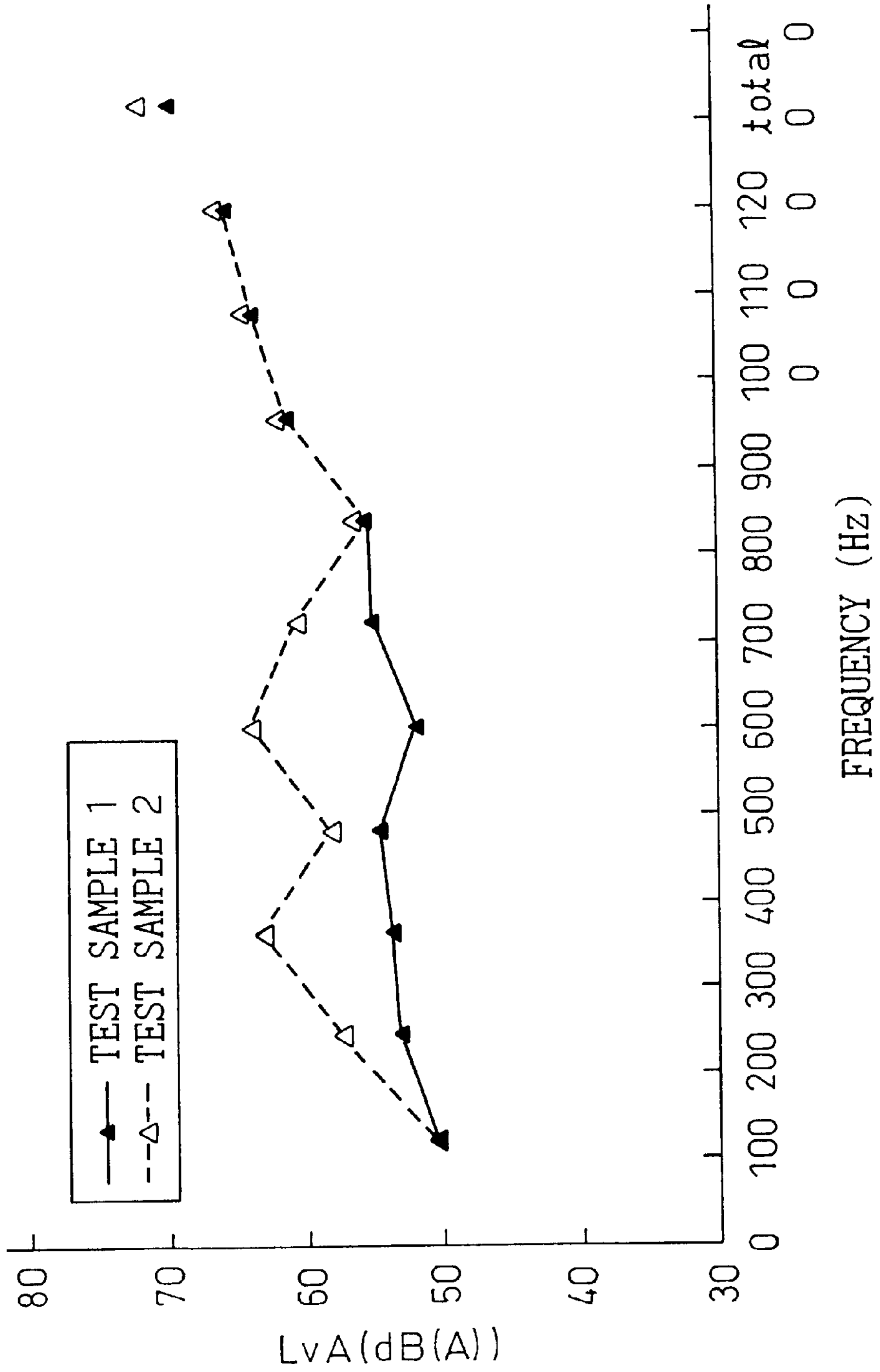
FIG. 3 shows examples of applying Fourier analysis and audibility correction to magnetostriction.

FIG. 3 shows an A-weighted vibration velocity levels (LvA) at each frequency component for each of the test samples 1 and 2 when they are magnetized at 60 Hz and 1.9 T. These are the values obtained by decomposing the values of speed, which is converted from the change with the passage of time in magnetostriction, into the intensity at each frequency by Fourier transform, and then correcting the decomposed values at each frequency according to the audible level (A-weighted). Here, the correction according to the audibility level means to be multiplied by a coefficient corresponding to audibility at each frequency.

As seen in FIG. 3, when the LvA at each frequency component are compared, it is observed that, although the LvA of the test sample 2 having a larger noise when it is fabricated into a transformer is equal to that of the test sample 1 at the fundamental frequency component (120 Hz), the LvA of the test sample 2 is rather higher at the second harmonic component (240 Hz) or above. Since the audible level becomes higher as the frequency becomes higher in a range up to 4 kHz, the higher the frequency is, the more the intensity is corrected in the range up to 4 kHz when the audibility correction is applied. For this reason, the noise level of the test sample 2 is high when it is fabricated into a transformer.

The present inventors considered that the reason why LvA of test sample 2 was high at higher harmonic wave components as mentioned above might be explained by the difference in the magnetostriction waveform. It is observed from FIG. 2 that $\lambda_{O-B}$ of test sample 2 having a higher tension has the inflection point in the vicinity of the magnetization magnetic flux density of 1.7 T, and magnetostriction increases sharply at a magnetic flux density exceeding 1.7 T.

Since test sample 1 with a lower film tension has a smaller induced magnetic anisotropy compared with test sample 2, closure domains that suppress the leakage of magnetic flux from surfaces increase in the vicinity of 1.7 T. These closure domains begin to disappear at 1.7 T and above, and magnetostriction increases accordingly. The present inventors consider that, since the variation of closure domains is large in test sample 1, the magnetostriction increases sharply, and that creates higher harmonic components and affects LvA. Such a sharp change causes the generation of noise having higher frequency components and undesirably raises the whole noise level.

On the other hand, there is no sharp change of magnetostriction in test sample 1, and the magnetostriction waveform increases smoothly in the whole range of magnetic flux density. It is considered that the reason for this smooth increase is because the magnetostriction increases gradually from a low magnetic flux density since the generation of closure domains is relatively low.

Figure 4:
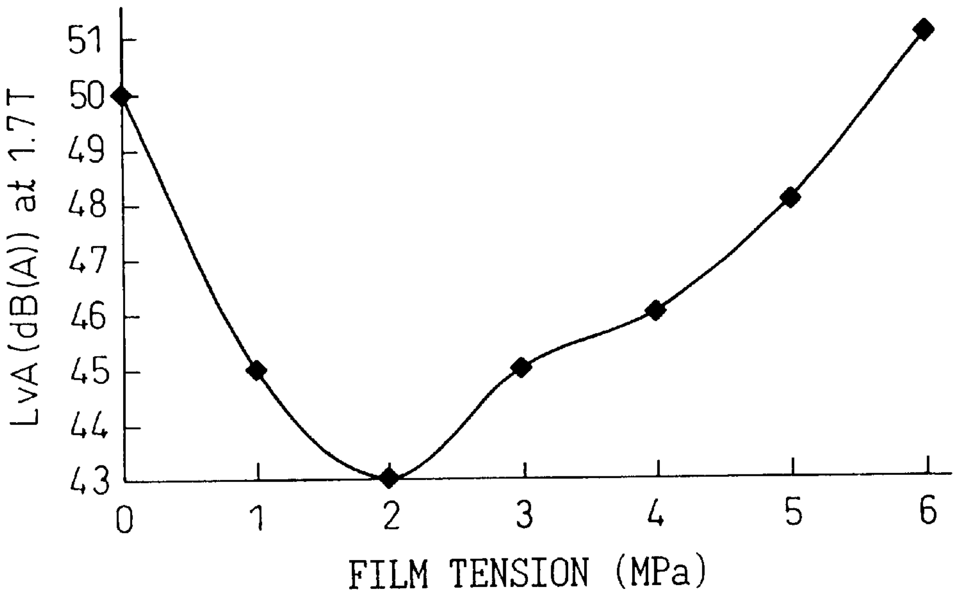
FIG. 4 is a graph showing the relationship between film tensions and magnetostriction.

FIG. 4 shows the relationship between film tensions and LvA. LvA lowers as a film tension increases, reaches the minimum point at 2.0 MPa and then increases again. Here, the reason for measuring at 1.7 T is that closure domains are easily formed at this magnetic flux density and $\lambda_B$ tends to be negative. Another reason is that the magnetic flux density used for the design of transformers is in this vicinity.

As a product having a film tension slightly lower than conventional products, a grain-oriented electrical steel sheet having an insulating film coated on a steel sheet was produced using a process where a glass film was not formed. (Y. Yoshitomi, O. Tanaka, et al: Ultrathick glassless high-permeability, grain-oriented silicon steel sheets with high workability. JMMM, 160, (1996), 123). This product has a coated film equal to conventional products (8 MPa) and its tension is higher than the tension claimed in the present invention. Further, in U.S. Pat. No. 5,961,744, disclosed is a steel sheet coated with an insulating film, which is the same as that coated on a conventional grain-oriented electrical steel sheet, on a material having no glass film thereon. However, these materials are for iron cores of turbine generators and the like, claim a film thickness of 2.5 μm or more (=8 MPa or more), and are intended to improve punching property and suppress shearing burr but not to lower magnetostriction.

From the above viewpoints, the present inventors considered that the noise of electrical apparatuses such as transformers, etc. could be lowered effectively by providing a grain-oriented electrical steel sheet having a smooth magnetostriction waveform with moderate steepness realized by providing an appropriate film tension to reduce the higher harmonics, which were, in magnetostriction, highly influential on noise. Thus the present inventors realized the present invention.

Next, reasons for specifying the present invention will be explained hereunder.

In the present invention, the tension imposed on a steel sheet by a film is specified to be in the range from 0.5 to 4.0 MPa based on the result in FIG. 4, to realize of moderate steepness in an actual magnetostriction waveform in order for the material to have excellent effects in lowering noise.

The reason for setting the lower limit at 0.5 MPa is that, since steel sheets are bound together so as not to be loosened when iron cores of transformers are fabricated and the compression force thereof is 0.5 MPa or more, a tension capable of withstanding the stress of this degree is required, otherwise strains will be developed in the steel sheet by external stresses and magnetostriction grows. Also, the reason for setting the upper limit at 4.0 MPa is that, if the film tension exceeds 4.0 MPa, the waveform smoothness will be lost and LvA will increase since steel sheets contract and then stretch sharply toward saturation at 1.7 T. Further, the preferable range of a film tension is from 1.0 MPa to 3.0 MPa.

The reason for limiting $\lambda_{19}$ to $1.5\times10^{-6}$ or less is that this limitation is essential for obtaining lower noise than before in high magnetic fields.

The reason for setting a sheet thickness at 0.27 mm or more is that many of transformers are fabricated in this thickness range, and the aforementioned conditions have to be met at this sheet thickness range in order to minimize noise.

According to the studies by the present inventors, the reason why a magnetostriction waveform can be controlled by a film tension as mentioned above is as follows. Closure domains dissipate in a demagnetization state due to the inverse effect of magnetostriction when a film tension is applied. The amount of dissipation is approximately proportional to the intensity of the film tension. These magnetic domains begin to appear when a steel sheet is magnetized at up to a magnetic flux density of about 1.7 T, and dissipate at or above said magnetic flux density. Accordingly, by appropriately controlling this tension, the magnetostriction waveform can be controlled and a smooth waveform can be developed depending on conditions.

EXAMPLE 1

A grain-oriented electrical steel sheet produced by a conventional method having the thickness of 0.30 mm was coated in five different coating weight so that the imposed tensions fall within the range from 0 to 7.0 MPa. The magnetostriction of each of these five test samples when they were magnetized at 1.4 T, 1.7 T and 1.9 T was measured by non-contact type magnetostriction measuring device using a laser Doppler system. The results are shown in Table 1.

Three-phase transformers of 500 kVA were fabricated using the test sample D which conforms to the waveform conditions of the present invention and test samples A and E which do not conform thereto, all of which were chosen from among these test samples, and the noise when they were magnetized at 50 Hz and 1.5 T was measured. The results are shown in Table 2.

As for the transformer fabricated with the material satisfying the conditions of the present invention, the noise could be lowered.

TABLE 1

| Test sample No. | Film tension (MPa) | $\lambda_{14}$ ($\times10^{-6}$) | $\lambda_{17}$ ($\times10^{-6}$) | $\lambda_{19}$ ($\times10^{-6}$) | Remarks |
|---|---|---|---|---|---|
| A | 0 | 0.05 | 1.52 | 4.82 | Comparative example |
| B | 0.7 | 0.26 | 0.43 | 1.46 | Invented example |
| C | 1.5 | 0.03 | 0.43 | 0.95 | Invented example |
| D | 2.1 | 0.07 | 0.13 | 0.42 | Invented example |
| E | 7.0 | −0.52 | −1.13 | 0.54 | Comparative example |

TABLE 2

| Test sample No. | Noise | Remarks |
|---|---|---|
| A | 49.5dB(A) | Conventional technology |
| D | 41.0dB(A) | Present invention |
| E | 47.8dB(A) | Conventional technology |

EXAMPLE 2

A grain-oriented electrical steel sheet produced by a conventional method having the thickness of 0.30 mm was coated in five different coating weights so that the imposed tensions fall within the range from 0.02 to 7.0 MPa.

The magnetostriction of each of these five test samples when they were magnetized at 1.4 T, 1.7 T and 1.9 T was measured by a non-contact type magnetostriction measuring device using a laser Doppler system. The results are shown in Table 3.

Three-phase transformers of 500 kVA were fabricated using test sample C which conforms to the waveform conditions of the present invention and test samples A and E which do not conform thereto, all of which were chosen from among these test samples, and the noise when they were magnetized at 50 Hz and 1.5 T was measured. The results are shown in Table 4.

As for the transformer fabricated with the material satisfying the conditions of the present invention, the noise could be lowered.

TABLE 3

| Test sample No. | Film tension (MPa) | $\lambda_{14}$ ($\times10^{-6}$) | $\lambda_{17}$ ($\times10^{-6}$) | $\lambda_{19}$ ($\times10^{-6}$) | Remarks |
|---|---|---|---|---|---|
| A | 0.02 | 1.03 | 2.08 | 4.71 | Comparative example |
| B | 0.7 | 0.13 | 0.55 | 1.24 | Invented example |
| C | 1.4 | 0.03 | 0.04 | 0.34 | Invented example |
| D | 2.5 | 0.28 | 0.30 | 0.86 | Invented example |
| E | 7.0 | −0.63 | −1.28 | 0.43 | Comparative example |

TABLE 4

| Test piece No. | Noise | Remarks |
|---|---|---|
| A | 47.2dB(A) | Conventional technology |
| C | 39.8dB(A) | Present invention |
| E | 46.5dB(A) | Conventional technology |

What is claimed is:

1. A grain-oriented electrical steel sheet, for a low-noise transformer, having a film that imposes a tension of 0.5 MPa to 4.0 MPa on the steel sheet.

2. A method for producing a grain-oriented electrical steel sheet, for a low noise transformer, characterized by imposing a film tension of 0.5 MPa to 4.0 MPa on the surface by coating or a method corresponding thereto, without forming a glass film on the grain-oriented electrical steel sheet or, if a glass film is formed, after removing the glass film by an arbitrary method.

3. A grain-oriented electrical steel sheet for a low noise transformer according to claim 1, characterized by having an $\lambda_{19}$ of $1.5\times10^{-6}$ or less.

4. A grain-oriented electrical steel sheet for a low noise transformer according to claim 1, characterized by having a sheet thickness of 0.27 mm or more.

5. A grain-oriented electrical steel sheet for a low noise transformer according to claim 3, characterized by having a sheet thickness of 0.27 mm or more.

* * * * *